United States Patent
Hsu

(10) Patent No.: US 10,148,891 B1
(45) Date of Patent: Dec. 4, 2018

(54) CARD OPERATION DEVICE FOR CONTROLLING EXPOSURE TIME

(71) Applicant: Tzu-Ping Hsu, Taoyuan (TW)

(72) Inventor: Tzu-Ping Hsu, Taoyuan (TW)

( * ) Notice: Subject to any disclaimer, the term of this patent is extended or adjusted under 35 U.S.C. 154(b) by 0 days.

(21) Appl. No.: 15/685,497

(22) Filed: Aug. 24, 2017

(51) Int. Cl.
    *G03B 7/00* (2014.01)
    *G03B 11/02* (2006.01)
    *H04N 5/225* (2006.01)
    *H04N 5/235* (2006.01)
    *H04N 5/355* (2011.01)

(52) U.S. Cl.
    CPC .......... *H04N 5/2353* (2013.01); *G03B 11/02* (2013.01); *H04N 5/2355* (2013.01); *H04N 5/35581* (2013.01)

(58) Field of Classification Search
None
See application file for complete search history.

(56) References Cited

U.S. PATENT DOCUMENTS

| | | | | |
|---|---|---|---|---|
| 3,800,307 A * | 3/1974 | Wechsler | ............... | G03B 35/00 396/324 |
| 4,053,910 A * | 10/1977 | Bodnar | .................. | G03B 11/02 396/337 |
| 4,875,066 A * | 10/1989 | Rickard | ................. | G03B 11/00 396/545 |
| 5,546,152 A * | 8/1996 | Fortson | .................. | G03B 11/00 396/337 |
| 2010/0098401 A1* | 4/2010 | Ismael | ................... | G03B 11/00 396/241 |
| 2017/0359495 A1* | 12/2017 | Hawes | ................... | H04N 5/238 |

* cited by examiner

*Primary Examiner* — W B Perkey
(74) *Attorney, Agent, or Firm* — C. G. Mersereau; Nikolai & Mersereau, P.A.

(57) ABSTRACT

A card operation device includes a body having a mounting hole for being mounted to a camera lens. A card is connected to the body and located in front of the lens. The card is movable up and down along rails in two insides of the body, and may be a masking card or a slotted card. The body has a driving unit and multiple positioning units. A controller is electrically connected to the body to control up-and-down movement, shaking and stopping of the card in front of the lens. The masking card and the slotted card are automatically operated when being set.

7 Claims, 7 Drawing Sheets

CARD OPERATION DEVICE FOR CONTROLLING EXPOSURE TIME

BACKGROUND OF THE INVENTION

1. Fields of the Invention

The present invention relates to a card operation device attached to the camera lens to automatically control exposure time.

2. Descriptions of Related Art

The correct exposure time is one of the key factors to have a good photo. Generally, the conventional cameras have its device to check the light and calculate the correct exposure time. However, when filming a scene that includes significant light contrast, such as filming sun rise or sunset, the exposure time will be totally different for the dark areas and the bright areas. When the light is dim, it is time to use a masking card, and a slotted card is usually used when the light getting bright. The exposure time for the masking card is ranged from minutes to seconds depending on the brightness of the sky. Minutes before the sun comes out, the sky is bright, the exposure time for the masking card is tenth of a second. It is time to use the slotted card. The slotted card is larger than the masking card, and includes a slot of 5 mm to 8 mm in width, and a dark fabric is mounted to the slot.

When using the masking card, the exposure time of the dark areas is 60 seconds, and the exposure time of the bright areas is 2 seconds. The exposing time of the camera shutter is set to be 60 seconds, and the masking card is put in front of the lens to cover the bright areas before pushing the shutter. The timer is activated and the masking card is removed when the timer counts to 58 seconds, and the exposure time ends after 2 seconds. The photo will have a balanced scene by using the masking card. If the masking card is not moved, there will be an obvious line formed at the conjunction area between the dark areas and bright areas, and the line is called the masking card line. When the users shakes the masking card up and down 6 mm to 10 mm, the masking card line will not appear, and this action is called "shaking masking card". It has a certain level of difficulty to learn the "shaking masking card". Before the shutter is activated, the user may adjust the position of the masking card from the viewing window or the display screen of the camera, however, once the filming starts, the viewing window or the display screen of the camera will be completely dark and the user cannot see the position of the masking card. The shaking action is performed by experience, and the time of shaking will be ranged from 3 to 5 seconds to 1 to 2 minutes or even 10 minutes. Some experienced users may not perfectly shake the masking card, not mention the unexperienced users.

When operating the slotted card, the user holds the shutter release at one hand, and uses the other hand to hold the slotted card. The user covers the lens completely by the card above the slot, and when the shutter is activated, the slotted card is moved upward to let the slot pass over the lens upward. The speed of the movement of the slotted card decides the light entering the camera via the lens. Usually, the slotted card should be moved upward slower after the shutter is activated to allow the light of the ground to enter into the camera, and when the sky is seen, the speed of the movement of the slotted card increases to prevent overly exposure. The shutter is released when the slot completely pass over the lens.

It requires two hands cooperation when operating the slotted card, and speed changes from one steady speed to another steady speed when the conjunction portion between the dark areas and the bright areas is exposed in the lens. If the photo shows that the brightness of the ground is too dark, and the brightness of the sky is ok, then for the next photo, the speed of the slotted card to the ground areas has to be slower than the previous one, while the speed of the movement of the slotted card for the sky is maintained the same. The change of speed from slow to quick has to be maintained the same. The operation of the slotted card depends on experience, and the speed of movement of the slotted card at the dark areas, the bright areas, and the conjunction portion between the dark areas and the bright areas has to be steady and correct. It takes a lot of time to try and practice.

The present invention intends to provide a card operation device attached to the camera lens to automatically control exposure time.

SUMMARY OF THE INVENTION

The present invention relates to a card operation device and comprises a body having a mounting hole which is mounted to a camera lens. A card is connected to the body and located in front of the lens. The card is movable up and down along rails in two insides of the body. The body has a driving unit and multiple positioning units. A controller is electrically connected to the body to control up-and-down movement, shaking and stopping of the card.

Preferably, the body includes an adjustment button for adjusting the card.

Preferably, an adjustment screw reaches into the mounting hole to secure the lens.

Preferably, the driving unit includes a guide rod and a slide is movably mounted to the guide rod. The driving unit has a motor which drives the slide to move along the guide rod. The card has a protrusion. The slide contacts and pushes the protrusion to move the card up and down. The multiple positioning units include a top micro-switch, a middle micro-switch and a bottom micro-switch. The top, middle and bottom micro-switches are electrically connected to the controller. The slide contacts the top, middle and bottom micro-switches when the slide moves along the guide rod.

Preferably, the card is a masking card or a slotted card. The controller comprises a timer and a motor revolution controller to proceed a masking card mode or a slotted card mode.

Preferably, when the controller proceeds the masking card mode, the timer sets a first dark area exposure time, a second bright area exposure time and a swing time factor. The controller activates the lens of the camera to film. The slide moves upward and drives the masking card upward from an initial position in front the lens until the protrusion contacts the middle micro-switch. The timer displays the first dark area exposure time and begins to countdown. The motor swings clockwise and counter clockwise according to the swing time factor. The slide drives the masking card up and down between bright areas and dark areas. When the countdown of the timer ends, the slide drives the masking card upward until the slide contacts the top micro-switch, and the timer displays the second bright area exposure time and begins to countdown. When the countdown of the timer ends, the exposure of the lens stops. The driving unit drives the slide downward to touch the bottom micro-switch is located, and the masking card moves to its initial position.

Preferably, when the controller proceeds the slotted card mode, the controller sets a first speed, a second speed and a transitional time of the slotted cards. The transitional time is defined as the slotted card moves from slow speed to high speed. The controller activates the lens of the camera to film, and the motor revolution controller commands the motor to operate clockwise at the first speed. The slide drives the slotted card to move upward, and the lens of the camera begins to expose and the slide moves upward until the slide contacts the middle micro-switch. The motor starts to operate counter clockwise at the first speed until the slide contacts the bottom micro-switch. The motor then starts to operate clockwise at the first speed until the slide contacts the middle micro-switch. When the slide contacts the middle micro-switch, the motor starts to operate clockwise at the second speed and the slide moves to contact the top micro-switch to end the filming.

The primary object of the present invention is to provide a card operation device which proceeds the masking card mode and the slotted card mode. The users set the exposure time for the dark areas and bright areas, and the relative position or shaking extent, and the filming by using the masking card becomes easy. When using the slotted card, the users set the speed for the dark areas and the bright areas, or adjust the positions that accelerates the movement of the slotted card, and the transitional time to easily complete the filming by using the slotted card. The card operation device reduces failure and is friendly to beginners.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
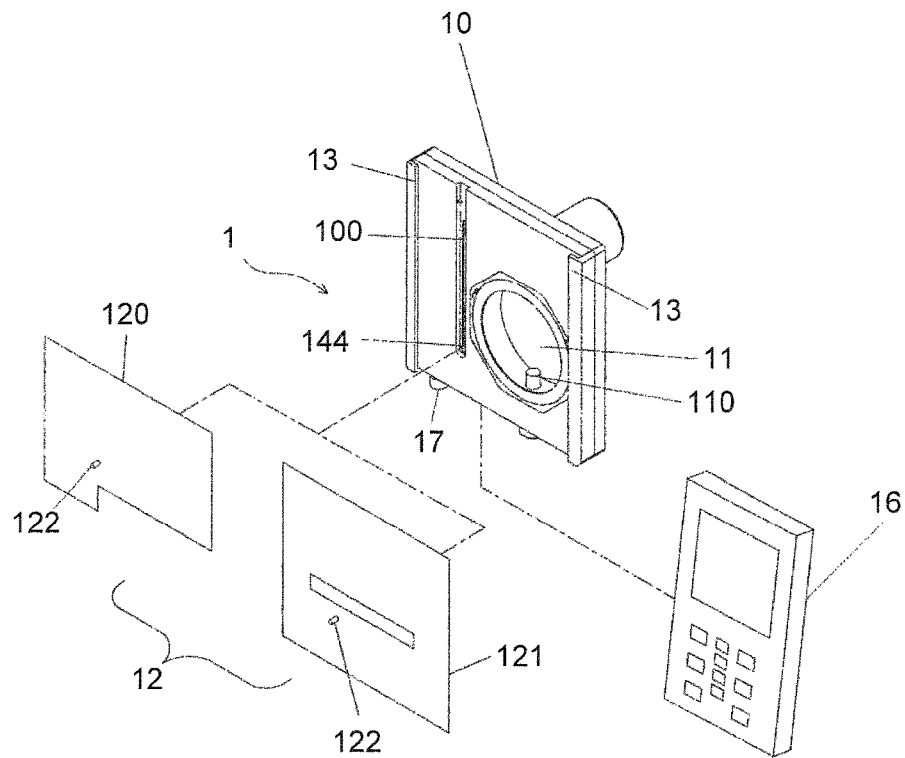
FIG. 1 is an exploded view of the card operation device of the present invention.
Figure 2:
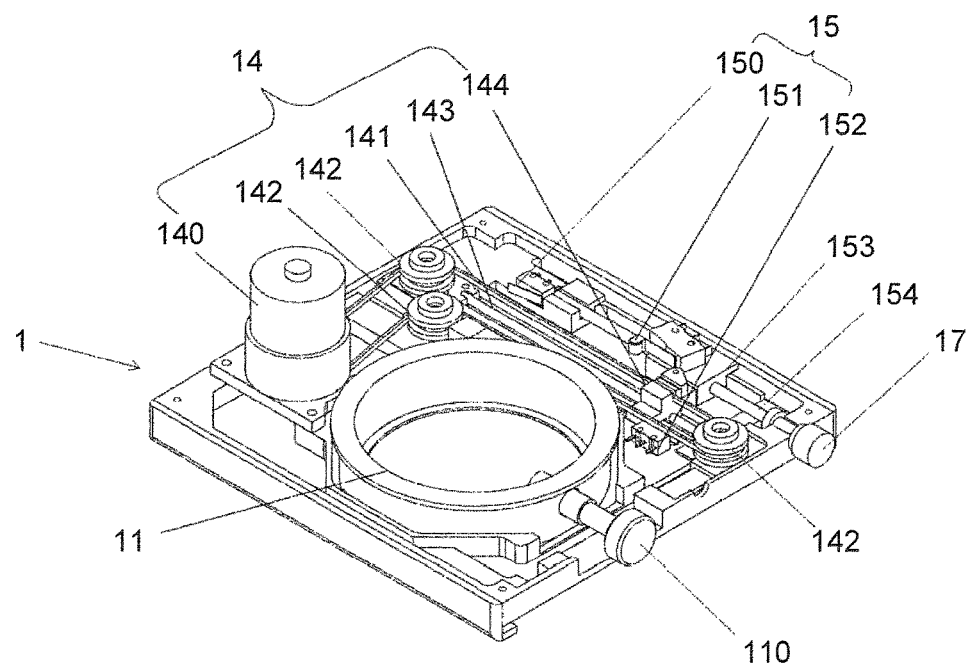
FIG. 2 shows the driving unit and the positioning units in the body of the card operation device of the present invention.
Figure 3:
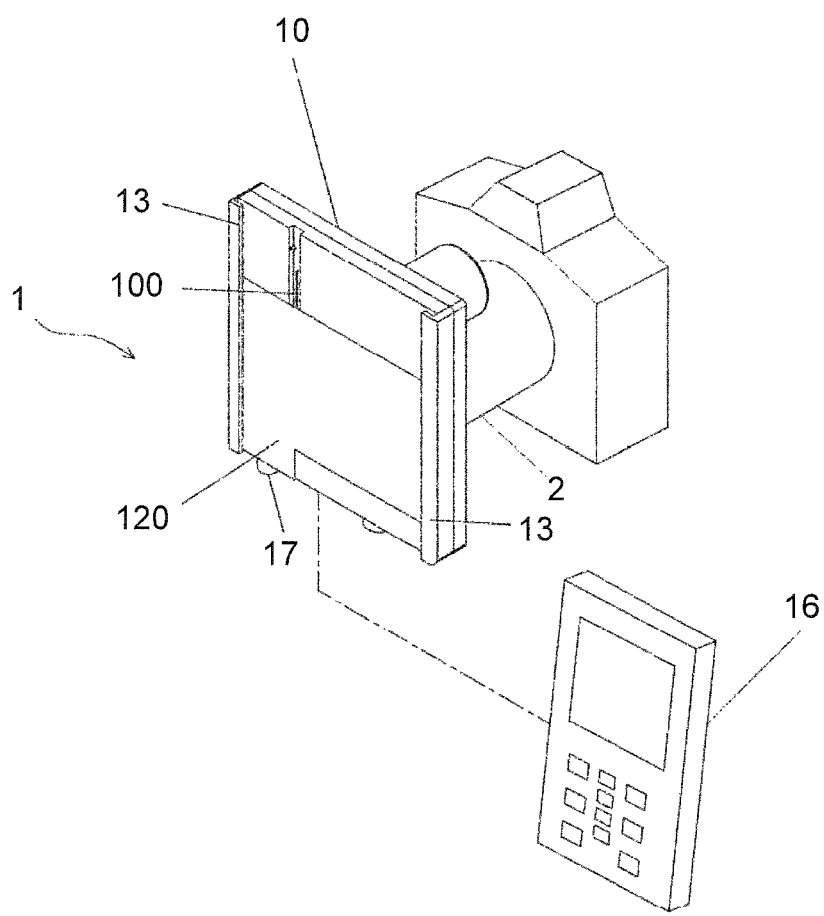
FIG. 3 shows that the card operation device of the present invention is attached to a camera.

Referring to FIGS. 1 to 7, the card operation device 1 of the present invention comprises a body 10 having a mounting hole 11 which is mounted to a camera lens 2. A card 12 is connected to the body 10 and located in front of the lens 2. An adjustment screw 110 reaches into the mounting hole 11 to secure the lens 2. The card 12 is movable up and down along rails 13 in two insides of the body 10. The body 10 has a driving unit 14 and multiple positioning units 15. A controller 16 is electrically connected to the body 10. The dots and the phantom lines in the drawings represent the electrically connection for the controller 16. The controller 16 sends commands to the driving unit 14 and the positioning units 15 to control up-and-down movement, shaking and stopping of the card 12.

The driving unit 14 includes a motor 140, a belt 141, a roller 142, a guide rod 143 and a slide 144. The slide 144 is driven by the motor 140 via the belt 141 and the roller 142 to be movably mounted to the guide rod 143. The card 12 has a protrusion 122, and can be a masking card 120 or a slotted card 121. When the slide 144 is driven by the motor 140, it contacts and pushes the protrusion 122 to be moved along the groove 100 of the body 10 so as to move the card 12 up and down in front of the lens 2 along the rails 13. The body 10 includes an adjustment button 17 for adjusting the card 12. The multiple positioning units 15 include a top micro-switch 150, a middle micro-switch 151 and a bottom micro-switch 152. The top, middle and bottom micro-switches 150, 151, 152 are electrically connected to the controller 16. The slide 144 contacts the top, middle and bottom micro-switches 150, 151, 152 when the slide 144 moves along the guide rod 143. The middle micro-switch 151 is installed to a seat 153 so as to be adjusted by the adjustment button 17. Specifically, the adjustment button 17 uses a threaded rod 154 to drive the seat 153.

As shown in FIGS. 4 to 7, the controller 16 comprises a timer 160 and a motor revolution controller 161 to proceed a masking card mode or a slotted card mode. The controller 16 acknowledges the position of the slide 144 by the feedbacks from the multiple positioning units 15.

Before filming, the body 10 is installed in front of the lens 2 and the power of the controller 16 is switched to "ON", the driving unit 14 brings the slide 144 downward to the bottom micro-switch 152, this is the initial position. The users can choose the masking card mode or the slotted card mode, and the filming will be proceeded automatically by the respective settings. The timer 160 of the controller 16 sets the dark area exposure time and the bright area exposure time to decide the time that the masking card 120 covers up the lens 2. The masking card 120 or the slotted card 121 automatically move up and down in front of the lens 2 along the rails 13 by the settings of the controller 16. The slide 144 moves from the initial position at the bottom micro-switch 152 and along the guide rod 143 to respectively contact the middle and top micro-switches 151, 150. The controller 16 sends commands to activate the motor 140 to operate clockwise or counter clockwise, or the change its speed, and the motor 140 correspondingly moves the slide 144.

Figure 4:
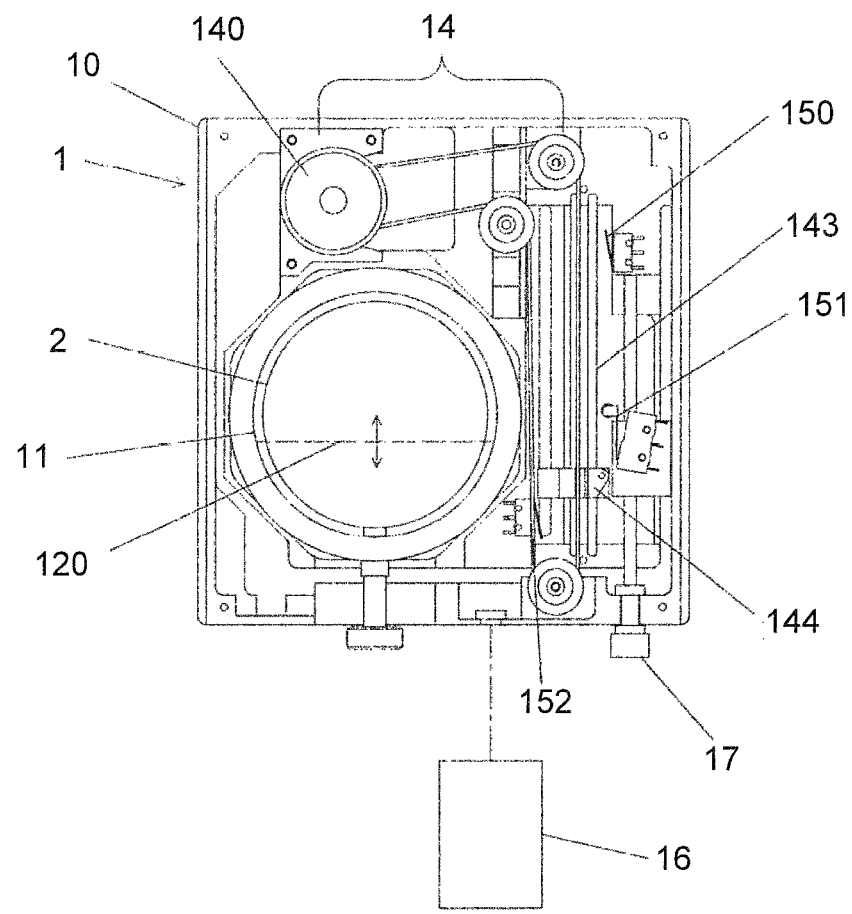
FIG. 4 shows that the masking card mode is used by the card operation device of the present invention.
Figure 5:
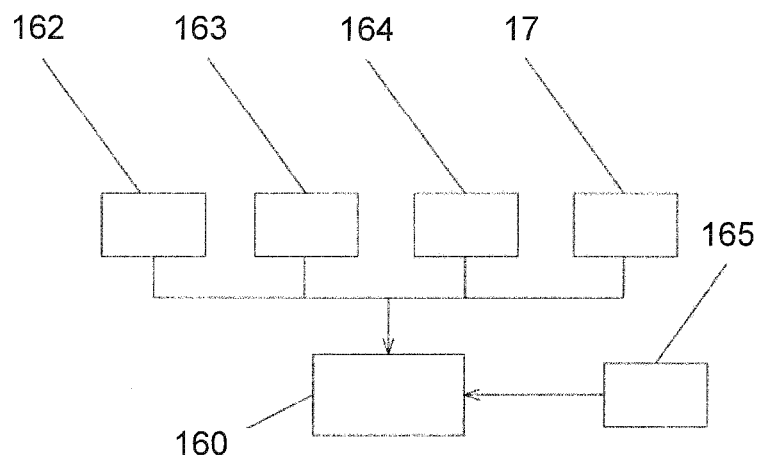
FIG. 5 shows the settings when using the masking card mode.

As shown in FIGS. 4 and 5, when the controller 16 proceeds the masking card mode, the timer 160 sets a first dark area exposure time 162, a second bright area exposure time 163 and a swing time factor 164. The first dark area exposure time 162 is set to be 58 seconds, and the second bright area exposure time 163 is set to be 2 seconds. The adjustment button 17 sets the masking card 120 to move up and down at a position in front of the lens 2. The swing time factor 164 sets the range of up-and-sown movement of the slide 144 in front of the lens 2, and the range is properly adjusted according the positioning units 15 and the practical requirements. The larger of the swing time factor 164 is set, the wider range of the movement of the masking card 120 will be, so that the masking card line can be removed. The controller 16 activates the lens 2 of the camera to film. When the activation button 165 of the controller 16 is pressed, the shutter of the camera is in operation. The slide 144 moves upward and drives the masking card 120 upward from the initial position in front the lens 2 until the protrusion 122 contacts the middle micro-switch 151. The timer 160 displays the first dark area exposure time 162 and begins to countdown. In the meanwhile, the motor 140 swings clockwise and counter clockwise according to the swing time factor 164. Therefore, the slide 144 drives the masking card 120 up and down between bright areas and dark areas. When the countdown of the timer 160 ends, the slide 144 drives the masking card 120 upward quickly until the slide 144 contacts the top micro-switch 150, and then the timer 160 displays the second bright area exposure time 163 and begins to countdown. When the countdown of the timer 160 ends, the exposure of the lens 2 stops. The driving unit 14 drives the slide 144 downward to the position to touch the bottom micro-switch 152. The masking card 120 is now ready for the next action.

Figure 6:
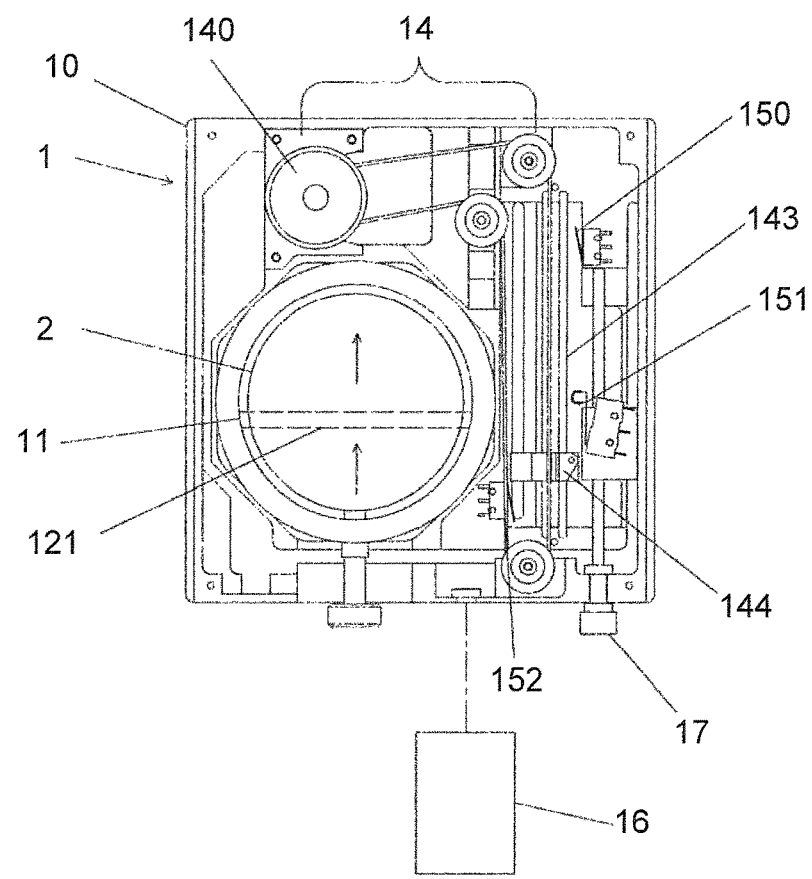
FIG. 6 shows that the slotted card mode is used by the card operation device of the present invention.
Figure 7:
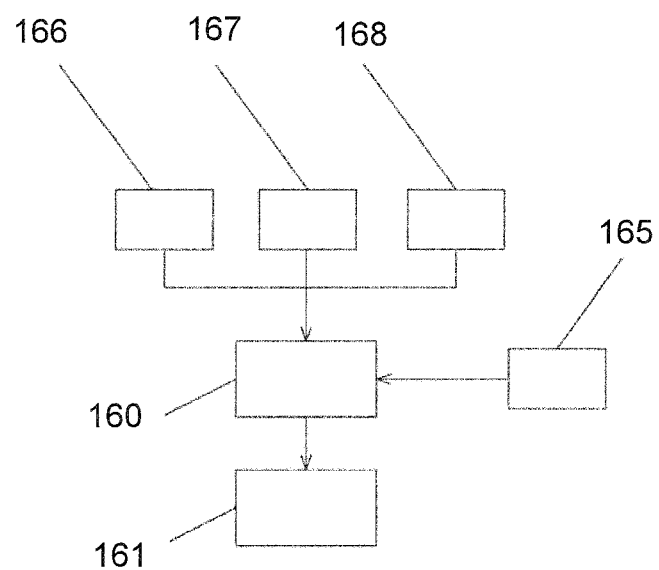
FIG. 7 shows the settings when using the slotted card mode.

As shown in FIGS. 6 and 7, the slotted card mode uses the slotted card 121 to replace the masking card 120. The slotted card 121 includes a slot with 5 mm to 8 mm in width, and a black fabric is attached to the slotted card 121 to cover up the slot. The slotted card 121 is slid into the rails 13 and the protrusion 122 of the slotted card 121 is put into the groove 100. The driving unit 14 drives the slide 144 to push and move the protrusion 122 in the groove 100.

When the controller 16 proceeds the slotted card mode, the controller 16 sets a first speed 166, a second speed 167 and a transitional time of the slotted cards 121. The transitional time is defined as the slotted card 121 moves from slow speed to high speed. The activation button 165 of the controller 16 is pushed to activate the lens 2 of the camera to film, and the motor revolution controller 161 commands the motor 140 to operate clockwise at the first speed 166. The slide 144 drives the slotted card 121 to move upward, and the lens 2 of the camera begins to expose and the slide 144 moves upward until the slide 144 contacts the middle micro-switch 151. The motor 140 starts to operate counter clockwise at the first speed 166 until the slide 144 contacts the bottom micro-switch 152. The motor 140 then starts to operate clockwise at the first speed 166 until the slide 144 contacts the middle micro-switch 151. When the slide 144 contacts the middle micro-switch 151, the motor 140 starts to operate clockwise at the second speed 167 and the slide 144 moves to contact the top micro-switch 150 to end the filming. The users adjust the settings and the position of acceleration according to the film result. The procedures can be repeated 3 to 4 times to have a perfect photo. The position of acceleration can be set by using the controller 16 to set the delay time factor 168 to decide the time required of the transition.

The present invention provides a card operation device in front of the lens and includes the masking card mode and the slotted card mode. The card operation device of the present invention makes the use of the masking card and the slotted card be easy by simply setting the exposure time for the dark areas and the bright areas, and the relative position of the card and the lens, and the range of the movement of the card. The filming can be automatically proceeded to get satisfied results. The use of the slotted card mode can set the speed for shooting the dark areas and the bright areas, and the acceleration position and the transitional time between quick speed and slow speed can also be adjusted.

While we have shown and described the embodiment in accordance with the present invention, it should be clear to those skilled in the art that further embodiments may be made without departing from the scope of the present invention.

What is claimed is:

1. A card operation device comprising:
a body having a mounting hole which is mounted to a camera lens, a card connected to the body and located in front of the lens, the card being movable up and down along rails in two insides of the body, the body having a driving unit and multiple positioning units, and
a controller electrically connected to the body to control up-and-down movement, shaking and stopping of the card.

2. The card operation device as claimed in claim 1, wherein the body includes an adjustment button for adjusting the card.

3. The card operation device as claimed in claim 1, wherein an adjustment screw reaches into the mounting hole to secure the lens.

4. The card operation device as claimed in claim 1, wherein the driving unit includes a guide rod and a slide is movably mounted to the guide rod, the driving unit has a motor which drives the slide to move along the guide rod, the card has a protrusion, the slide contacts and pushes the protrusion to move the card up and down, the multiple positioning units include a top micro-switch, a middle micro-switch and a bottom micro-switch, the top, middle and bottom micro-switches are electrically connected to the controller, the slide contacts the top, middle and bottom micro-switches when the slide moves along the guide rod.

5. The card operation device as claimed in claim 4, wherein the card is a masking card or a slotted card, the controller comprises a timer and a motor revolution controller to proceed a masking card mode or a slotted card mode.

6. The card operation device as claimed in claim 5, wherein when the controller proceeds the masking card mode, the timer sets a first dark area exposure time, a second bright area exposure time and a swing time factor, the controller activates the lens of the camera to film, the slide moves upward and drives the masking card upward from an initial position in front the lens until the protrusion contacts the middle micro-switch, the timer displays the first dark area exposure time and begins to countdown, the motor swings clockwise and counter clockwise according to the swing time factor, the slide drives the masking card up and down between bright areas and dark areas, when the countdown of the timer ends, the slide drives the masking card upward until the slide contacts the top micro-switch, and the timer displays the second bright area exposure time and begins to countdown, when the countdown of the timer ends, the exposure of the lens stops, the driving unit drives the slide downward to touch the bottom micro-switch is located, and the masking card moves to its initial position.

7. The card operation device as claimed in claim 5, wherein when the controller proceeds the slotted card mode, the controller sets a first speed, a second speed and a transitional time of the slotted cards, the transitional time is defined as the slotted card moves from slow speed to high speed, the controller activates the lens of the camera to film, the motor revolution controller commands the motor to operate clockwise at the first speed, the slide drives the slotted card to move upward, the lens of the camera begins to expose and the slide moves upward until the slide contacts the middle micro-switch, the motor starts to operate counter clockwise at the first speed until the slide contacts the bottom micro-switch, the motor then starts to operate clockwise at the first speed until the slide contacts the middle micro-switch, when the slide contacts the middle micro-switch, the motor starts to operate clockwise at the second speed and the slide moves to contact the top micro-switch to end the filming.

* * * * *